Patented Dec. 11, 1928.

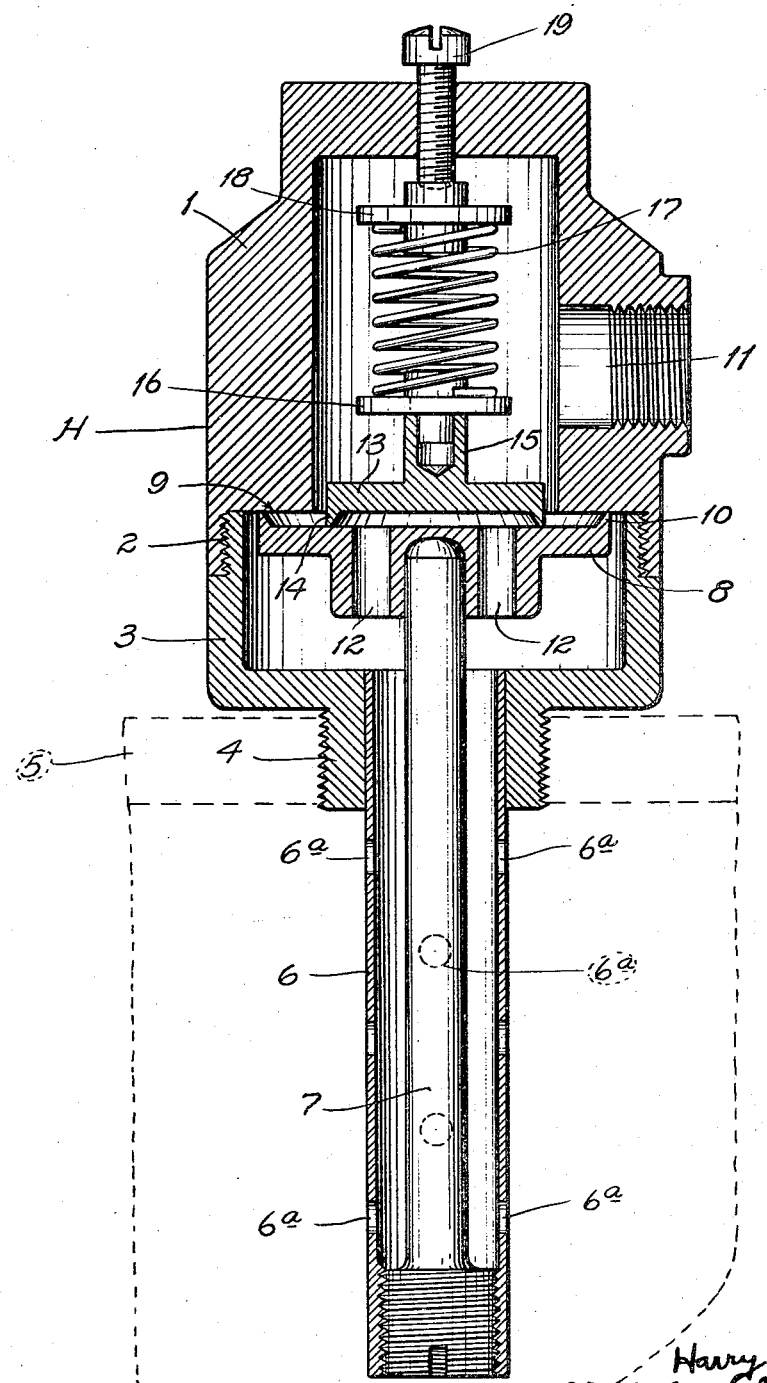

1,694,492

UNITED STATES PATENT OFFICE.

HARRY C. TABLER, OF ST. LOUIS, MISSOURI, ASSIGNOR TO AMERICAN HEATER CORPORATION, OF ST. LOUIS, MISSOURI, A CORPORATION OF MISSOURI.

PRESSURE AND TEMPERATURE CONTROL VALVE.

Application filed July 2, 1927. Serial No. 203,079.

My invention relates to safety devices for hot water heaters, boilers and the like. It has for its object a device that is responsive to pressure changes and also to temperature changes.

The invention consists principally in a pressure and temperature control valve including a thermosensitive tube and a valve operated thereby, said tube communicating with the interior of the tank or other container and a valve actuated by the pressure of the fluid or liquid in the tank or container. The invention also consists in the pressure and temperature control valve and in the parts and combinations and arrangements of parts hereinafter described and claimed.

The accompanying drawing is a longitudinal sectional view of a valve embodying my invention.

A valve housing, indicated generally by the letter H, comprises a hollow housing member 1 having a counterbored interiorly threaded end portion 2 and a second housing member 3 having an exteriorly threaded portion screwed thereinto. Said second housing member has a threaded projection 4 adapted to be screwed into the wall of a tank 5, boiler, or other container of liquid or fluid.

Secured in the second housing member 3 and projecting into the tank or container is a tube 6 of copper or other suitable material that expands and contracts with temperature changes. Said tube has perforations permitting water from the tank to pass into the tube and the housing. Secured in the tube, as by being screwed into the free end thereof, is a rod 7 of relatively non-expansible material. Mounted on the end of said rod 7 is a valve 8 that is seated against a shoulder 9 in the end of the bore of said first housing member 1. Preferably the valve 8 is provided with an upstanding annular flange 10 that contacts with the shoulder 9. Thus if the tube 6 expands, the rod 7 will be moved with it, carrying the valve 8 away from its seat 9 and permitting the water or other fluid to pass from said second housing member 3, past the temperature valve 8 into the first housing member 1 and out through a relief opening 11 in the side wall of the first housing member.

The temperature actuated valve 8 is provided with a plurality of openings 12 therethrough. Mounted in the first housing member 1 is a valve 13 that seats against the face of the temperature valve 8 and is large enough to cover all of the openings 12 through said temperature valve. Preferably said valve 13 is provided with an annular flange 14 that seats against the temperature valve 8. Mounted in the stem 15 of said valve 13 is a seat 16 for one end of a coil spring 17 whose other end abuts against a similar seat 18 that rests against a screw 19 in the end of the housing 1.

If the pressure of the water or other fluid in the tank becomes great enough to overcome the resistance of the spring 17, the pressure valve 13 will be lifted away from the temperature valve 8, thus permitting water to pass through the holes 12 in the temperature valve 8 into the bore of the first housing member 1 and out through the relief opening 11. The pressure at which the pressure valve operates may be varied by turning the screw 19 to adjust the pressure of the spring 17.

The above described valve includes in a single housing a combination valve that is responsive to temperature and to pressure. The device is simple and durable in construction and is an excellent safety device for use in hot water heaters, boilers and other devices where either the temperature or pressure of the water or other fluid is apt to exceed a safety point.

Obviously numerous changes may be made without departing from the invention and I do not wish to be limited to the precise construction shown.

What I claim is:

1. A valve comprising a housing adapted to be secured to a hot water tank or the like and communicating with the interior thereof, a thermosensitive member mounted in said housing and extending into the tank, a relatively non-expansible rod secured to said thermosensitive member to move therewith, a valve on the end of said rod normally seated against a seat provided therefor in said housing to prevent water from passing out, said valve being provided with openings therethrough and a second valve in said housing large enough to cover the openings through said first valve and normally seated against said first valve but yieldable under predetermined pressure of the water in the tank, said housing being provided with a relief opening on the opposite side of said valves from said tank to permit escape of water when either of said valves is actuated.

2. A valve of the kind described comprising a housing having a shoulder therein and communicating with the interior of the tank, a thermosensitive tube mounted in said housing and extending into the tank, a relatively non-expansible rod secured in said tube, a valve on the end of said rod normally seated against said shoulder in said housing, said valve being provided with openings therethrough, a second valve in said housing large enough to cover the openings through said first valve, and a spring acting on said second valve to normally hold it against said first valve, said housing being provided with a relief opening on the opposite side of said valve from the tank.

3. A valve comprising a housing adapted to be secured to a hot water tank or the like and having a shoulder therein, a perforated thermosensitive tube mounted in the end of said housing and extending into the tank, a relatively non-expansible rod secured in said tube, a valve on the end of said rod normally seated against said shoulder in said housing, said valve being provided with openings therethrough, a second valve in said housing large enough to cover the openings through said first valve, and a spring acting on said second valve to normally hold it against said first valve, said housing being provided with a relief opening on the opposite side of said valves from the tank.

4. A valve comprising a housing adapted to be secured to a hot water tank or the like and having a shoulder therein, a perforated thermosensitive tube mounted in the end of said housing and extending into the tank, a relatively non-expansible rod secured in said tube, a valve on the end of said rod normally seated against said shoulder in said housing, said valve being provided with openings therethrough, a second valve in said housing large enough to cover the openings through said first valve, a spring acting on said second valve to normally hold it against said first valve, said housing being provided with a relief opening on the opposite side of said valves from the tank, and means for adjusting the tension of said spring.

Signed at St. Louis, Missouri, this 30 day of June, 1927.

HARRY C. TABLER.